UNITED STATES PATENT OFFICE.

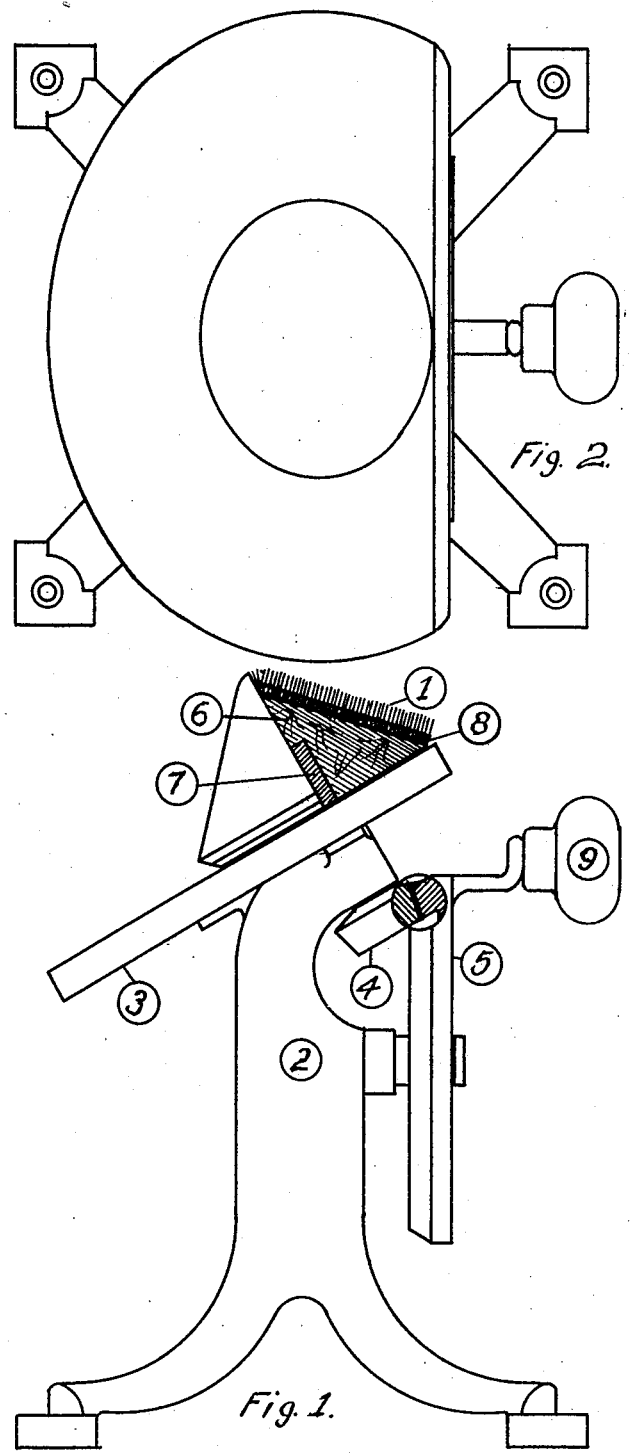

ANSELM DE GHETTO, OF CLIFTON, NEW JERSEY.

HOUSEHOLD POTATO-PEELER.

1,355,393.  Specification of Letters Patent.  Patented Oct. 12, 1920.

Application filed June 26, 1920. Serial No. 392,003.

*To all whom it may concern:*

Be it known that I, ANSELM DE GHETTO, a citizen of the United States, residing at No. 2 South Ave., city of Clifton, in the county of Passaic and State of New Jersey, have invented a new and useful Household Potato-Peeler, of which the following is a specification.

My invention relates to the improvement of an economical potato peeler, in which a conical steel wire brush is used to scrape off the peels; the object of my improvement is to peel potatoes with the least bit of waste.

I attain these objects by the mechanism illustrated in the accompanying drawing, in which—

Figure 1 is a vertical view of the entire device; Fig. 2 is a plan view of the device.

It consists of the wooden cone 6, which is covered with the steel wire brush 1, the wires being inserted in the fabric strip 8, which in turn is glued to the cone 6. The cone 6 is connected to the pinion gear 4 by the shaft 7, the pinion 4 and the bevel gear 5 have a 4:1 ratio; the gear 5 is provided with the crank 9.

The wooden rest 3 is fastened to the cast iron frame 2.

I am aware that at present in the household potatoes are peeled with a knife or knife-like device which makes it impossible to peel potatoes without a certain amount of waste; but with a conical wire brush it is possible to clean or scrape off the peel of any potato regardless as to shape, size, and form, with but little or no waste.

I claim—

A machine for peeling fruit or vegetables comprising a supporting frame, an inclined rest mounted thereon, a rotatable peeling member mounted with its axis at an angle to the inclined rest, and means for rotating said peeling member.

ANSELM DE GHETTO.